United States Patent [19]

Walker

[11] 4,084,483

[45] Apr. 18, 1978

[54] PANTOGRAPH APPARATUS

[76] Inventor: James B. Walker, 3151 W. Argyle, Chicago, Ill. 60625

[21] Appl. No.: 765,926

[22] Filed: Jan. 27, 1977

[51] Int. Cl.² .............................................. B23C 1/18
[52] U.S. Cl. .................................... 90/13.3; 90/13 R; 144/144 R
[58] Field of Search ...................... 90/13.3, 13.4, 13.6, 90/13.7, 13.9, 13 R; 144/144 R

[56] References Cited

U.S. PATENT DOCUMENTS

| 1,058,384 | 4/1913 | Peters | 90/13.3 |
| 3,739,824 | 6/1973 | Hoenig | 144/144 R |

FOREIGN PATENT DOCUMENTS

| 923,101 | 2/1955 | Germany | 90/13.4 |

Primary Examiner—Gil Weidenfeld
Attorney, Agent, or Firm—Gerald T. Shekleton

[57] ABSTRACT

An improved pantograph apparatus for the duplication of original works of a large range of sizes, having a modular copying assembly mounted on two spaced support shafts and supported on each shaft at a desired height by upper and lower resilient compression members. The modular copying assembly is interchangeable with other modular copying assemblies to give the inventive apparatus great flexibility in the number of copies reproduced from one original. The resilient compression members are also interchangeable with other resilient compression members of different lengths for placing the copying apparatus at a selected height on the support shafts, which height may correspond to the maximum cross section of the original work being copied.

6 Claims, 5 Drawing Figures

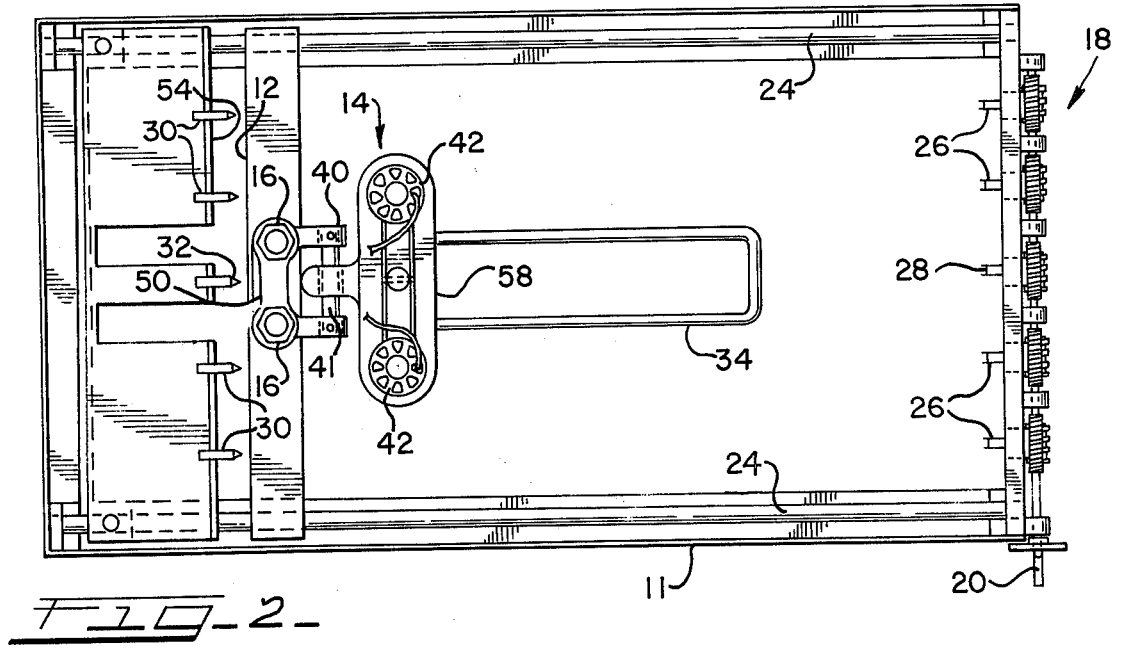
FIG_2_
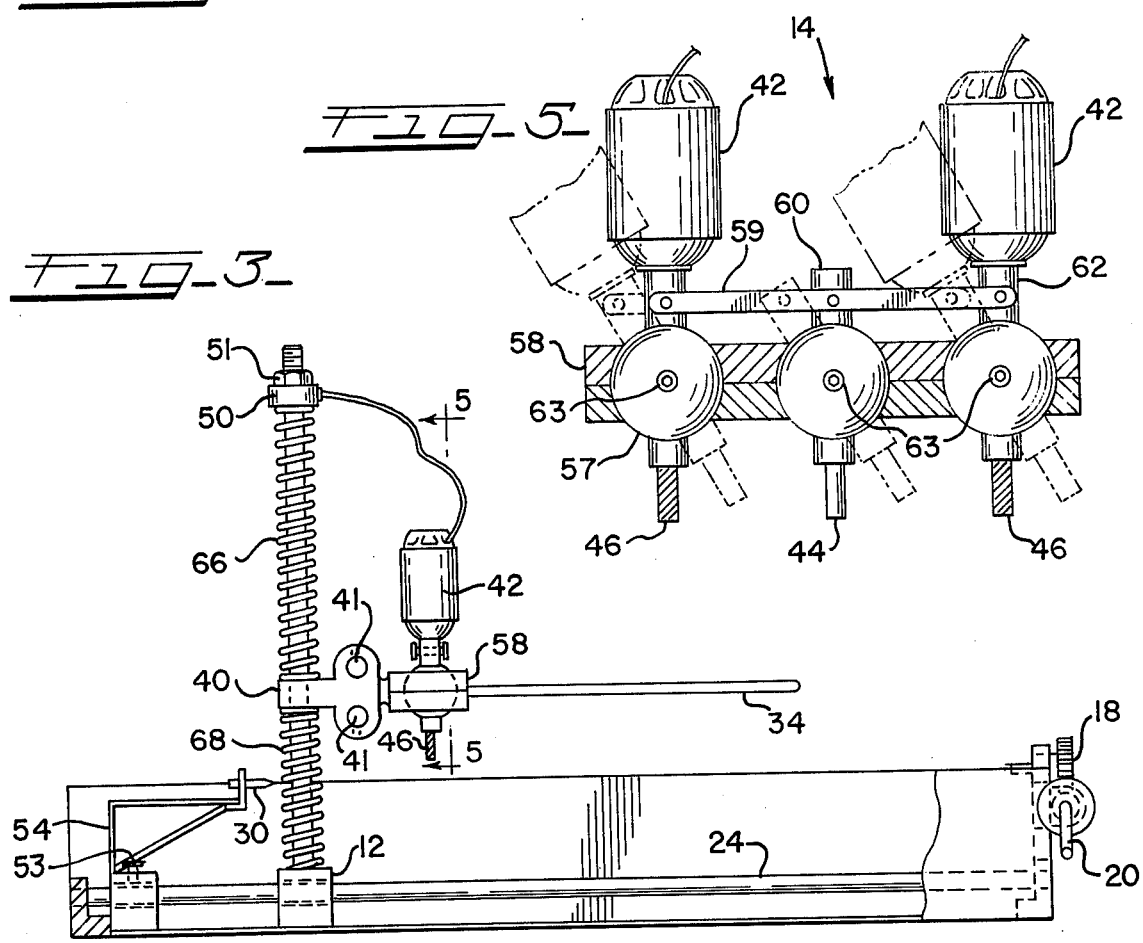
FIG_5_
FIG_3_

PANTOGRAPH APPARATUS

BACKGROUND OF THE INVENTION

This invention relates to a pantograph apparatus capable of duplicating a variable number of copies from a single master pattern.

Pantographs which produce multiple copies from a master pattern are well known to those skilled in the art. These prior art pantographs have been proven to be generally unacceptable, however, suffering from a number of common disadvantages. One disadvantage generally shaped by the prior art as a whole is the presence of vibrational movement within the apparatus itself. This vibrational movement is usually caused by the motor driving the styluses. In efforts to solve this problem, various measures have been taken. The motor has been, in some instances, spaced apart from the work in an effort to isolate the vibration, with the styluses driven by an endless belt to form the copy. However, this approach necessitated the use of the parallelogram principal with its attendant problems of accuracy in reproduction.

Other problems are apparent in the prior art, most notably, that of accommodating objects of different diameters and widths, the most common approach being adjustment to a particular height through a shaft threaded for vertical positioning. Such an arrangement requires precise threading, gearing and strong support to accommodate the great weight necessary for the proper height adjustments. Other measures attempting to obviate the great expense associated with machining the precise threading and gears have included the use of counterweights which are adjustably displaced for vertical height adjustment. Still others have used a single helical spring in combination with the threaded shafts for height adjustment. However, it has been found that the use of a single spring on work pieces having variable thicknesses causes different biasing forces to be exerted by the stylus upon different portions of the copies, thereby occasioning inaccuracies in the copy at the extremities of the work piece, i.e., at the widest and narrowest cross sections of the work piece. Also, those work pieces uniformly very narrow in cross section would be subject to much less stylus pressure than those work pieces having a uniformly large cross section.

SUMMARY OF THE INVENTION

The present invention overcomes many of the disadvantages of the prior art, and, in addition, expands the capability of a pantograph to allow the reproduction of a large number of copies from a single master while retaining the capability of accuracy generally associated with a small number of copies. Further, accuracy of reproduction is not impaired when duplicating masters, either very large or small, in cross section or length.

Accordingly, the present invention utilized a standard rectangular frame on which is mounted a sleeved support beam for horizontal movement within the frame, similar to that shown in U.S. Pat. No. 3,739,824. A pair of helical springs are mounted over each of these rods and secured on the top by a spacing bar and two nuts. Biased between the pair of springs on each support rod is a copying assembly having a center master stylus and, in one embodiment of the invention, two flanking styluses, secured for following parallel movement independent of said copying assembly support.

The upper and lower helical springs combine to position the copying assembly at a selected height at which the styluses will be biased against the work pieces with the correct amount of force. The upper springs act downwardly against the copying assembly and lower springs to maintain the copying assembly's position and dampen the vibration occasioned by the copying apparatus. The lower springs urge the copying assembly upwardly. With the subject invention, an operator may adapt the apparatus to duplicate original work pieces having cross sections of varying diameter without reducing the accuracy of reproduction. Further, such adaptations are made possible in an inexpensive manner which does not require a heavily constructed apparatus.

To accomplish this flexibility, the sum of the lengths of the complementary upper and lower springs remain constant within each pair. But, varying the length of upper and lower springs relative to each other allows selection of the vertical position of the copying assembly in the following manner: the length of the lower spring length may be increased, for example, and the length of the upper spring decreased to raise the elevational position of the copying assembly. Conversely, the lower spring can be decreased in length and the length of the upper spring increased to lower the elevational position of the copying assembly.

Each pair of helical springs is interchangeable with another pair of upper and lower springs having different lengths relative to one another, yet still retaining the same overall height. With such interchangeability of pairs of springs the height of the stylus relative to the center of the work piece can vary with the length of the lower spring. This arrangement allows all vibrations caused by the operation of the apparatus to be effectively dampened by the use of the helical springs on the support rods, while at the same time, providing easy vertical height positioning through the use of different lengths of springs for each given width or diameter of work piece, thereby retaining accuracy of reproduction.

In addition, the copying assembly may be easily detached from the support rods and replaced with other larger copying assemblies having a capacity for the production of a larger number of copies from a single master.

The weight of each part is kept to a minimum by the elimination of the expensive and heavy vertical positioning means generally found on apparatus of this type, thereby allowing greater freedom of construction and structure. This novel reduction of a copying apparatus to a minimum number of parts, while retaining more flexibility and capacity than before possible, provides an inexpensive pantograph which is capable of fulfilling the needs of both the beginning hobbyist and the most experienced professional.

It is therefore an object of the subject invention to provide a pantograph apparatus which is capable of producing a plurality of superior copies from one master copy.

Another object of the present invention is a pantograph apparatus which is easily adjustable in height.

A further object of the subject invention is the ability to produce a variable number of copies from a single master and the ability to quickly and easily switch from a capability to reproduce a given number of copies to a capability to reproduce an even larger number of copies from a single master.

Still another object of the subject invention is an easily tooled, inexpensive pantograph apparatus which uses a minimum number of parts and yet retains a great flexibility and capacity.

Further objects of the invention, together with additional features contributing thereto and advantages accruing therefrom will be apparent from the following description of one embodiment of the invention when read in conjunction with the accompanying drawings wherein:

FIG. 2 is a top plan view of the embodiment of the subject invention shown in FIG. 1.

FIG. 3 is a side view of the subject invention showing the copying assembly positioned at a lower height to accommodate work pieces of a small cross section.

FIG. 5 is a cross section taken along the lines 5—5 of FIG. 3 showing the following pivotal movement of the master and copy styluses.

Figure 1:
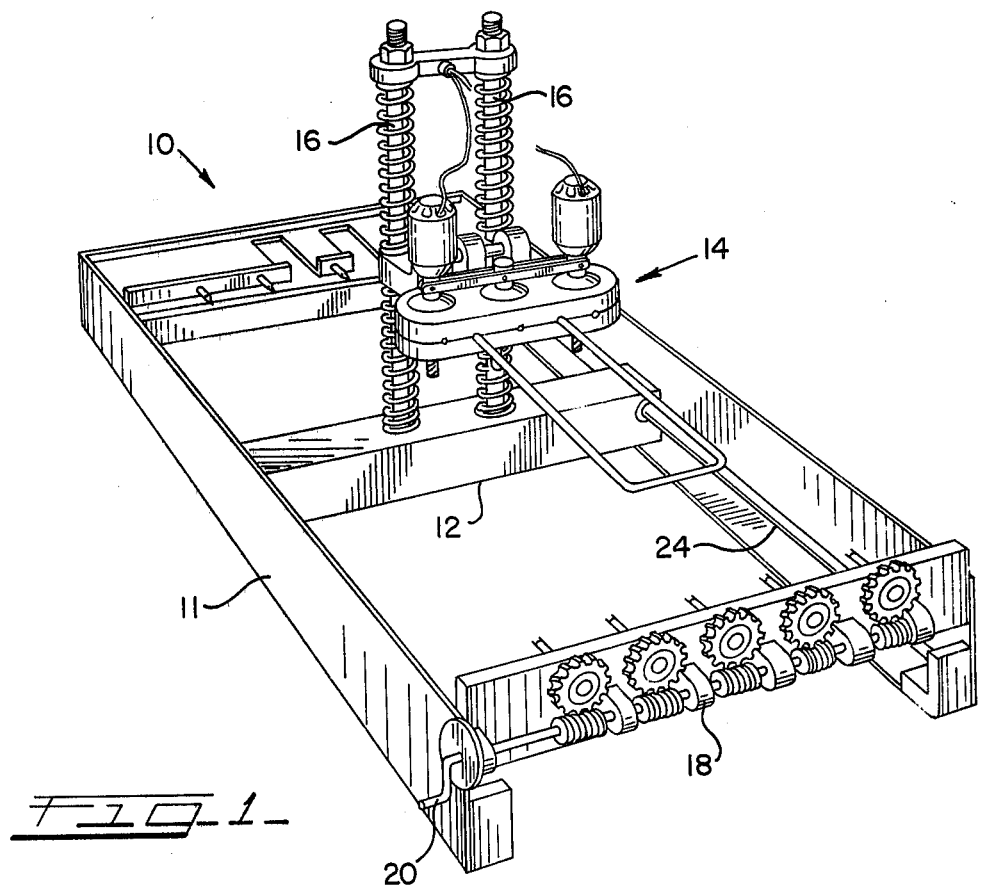
FIG. 1 is a perspective view of one embodiment of the subject invention.

Referring now to FIG. 1 there is shown the pantograph apparatus 10 of the subject invention comprising a rectangular frame 11 which may be of any size necessary to provide a desired number of copies to be made from a single master or original. Thus, while shown here providing the capacity for four work pieces to be copied from one master, it should be understood that with the subject invention, the frame may be formed as large as necessary to provide the desired number of work copies from one master.

In general, the subject invention comprises a cutting assembly 14, mounted on a cross bar 12, through support shafts 16 for horizontal movement along guide shafts 24.

The frame 11 is constructed in a manner known in the art, providing for identical rotary motion imparted to each work piece by a drive means comprising helical and worm gear system 18, driven by hand crank 20. Of course, it is anticipated that any drive means may be used which will turn the individual work pieces at exactly identical rates and, in addition, may be powered by an appropriate motor rather than hand driven.

The drive pins 26 and 28, keyed to helical gears 18, preferably have two spaced pins for forcing a following motion in the work piece, while the centering pins 30 and 32 may have pointed extensions for precisely centering the work piece and allowing its rotation in conformance with the helical gear drive means 18. The centering pins 30 and 32 are supported by an L-shaped frame 54 riding on the guide rods 24. In this manner the centering pin and pin assembly may be adjusted to conform to any length work piece less than the maximum which the frame length will allow. The pin assembly may be secured by thumb screw 53, or other suitable means to maintain the work piece in its centered position.

The cross bar 12 has opposite ends mounted over the guide bars 24 for sliding movement. Mounted on the cross bar 12 are two upstanding spaced support shafts 16 having threaded upper portions. About each shaft is coiled a pair of springs 66 and 68. Between the upper springs 66 and the lower springs 68, and supported by the lower springs 68, is the cutting assembly support member 40.

The support shafts 16 are retained in a constant spaced relationship by a spacer bar 50, which rests on top of each upper spring 66, the cutter assembly support 40 and the cross bar mountings, all cooperating to retain the support shafts 16 in exact parallel alignment. Nuts 51 secure the spacer bar 50 and adjustably tighten to biase the upper spring 66 and the lower spring 68 against the cutter assembly 40 with equal force, thereby stabilizing the cutter assembly equally from displacements.

Rigidly attached to the cutter assembly support 40, by means of two removable support rods 41, through cooperating openings in the support 40, is the stylus support plate 58, supporting the cutter assembly 14, which is thereby held in a relatively fixed attitude for transmitting all unwanted vibrational forces to the cutter assembly support 40, although it may still move vertically to a limited degree. These unwanted vibrational forces are then dampened by the upper and lower springs 66 and 68.

The stylus support plate 58 comprises two identical plates mounted together, forming with the stylus shaft assemblies 60 and 62, a ball and socket arrangement 57 for each stylus, making each stylus capable of movement through approximately a 60° arc in both the $x$ and $y$ planes independent of the stylus support plate 58. Set screws 63 may be employed to lock the styluses in a desired position relative to the stylus support plate 58. Each stylus shaft is connected in parallel for a direct following movement by a tilting rod 59, secured to each stylus shaft 60 and 62. Thus, any movement of the master stylus 44, in following the design or contours of an original work piece, is transmitted by the master stylus shaft 60 through the tilting bar 59 to the copy stylus shaft 62, causing the copy styluses 46 to etch, carve or engrave the identical design on the copy work pieces as drive means 42 drive copy styluses 46 at extremely high rotational speeds. While the drive means 42 is shown here as fractional horsepower electric motors, any drive means capable of directly driving a stylus at high rotational speeds is envisioned as within the scope of this invention.

Handle 34 is attached to the stylus support plate for drawing the cutter assembly along the length of the work pieces. The sleeved connection of the cross bar 12, on the guide rod 24, enables the entire assembly to be moved smoothly and easily within the frame 11. While the use of the handle 34 is shown, drive means may also be adapted for the reciprocal movement of the cross bar within the frame to automate the copying process. If such a drive means is used in conjunction with another drive means for rotating the work piece, the entire operation of making copies from an original may be completely automated for dramatic savings in time and increases in production.

Figure 4:
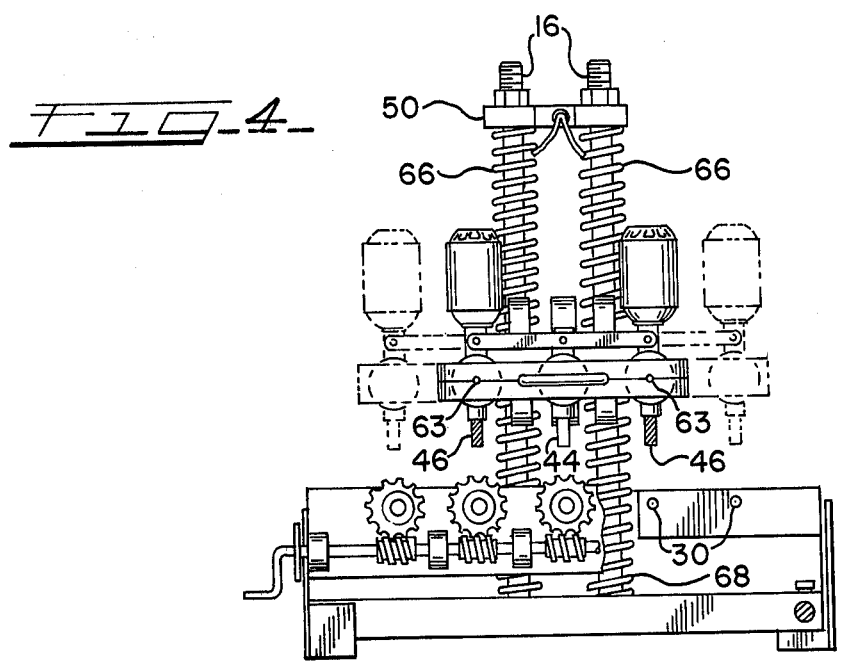
FIG. 4 is a front view of one embodiment of the subject invention showing, in relief, additional cutting styluses.

Should the operator wish to produce more than two copies from a single original and thus expand the capabilities and efficiency of the subject invention, this is made possible by the easy replacement of a single modular unit. For example, should the operator wish to expand from a two copy capacity to the capacity of the frame 11 as shown, or, four copies from one original, the two support pins 41 are removed to detach the cutter assembly 14. The new cutter assembly module may then be added, with the expanded capacity of four copy styluses and their respective drive means 42. Such an augmented assembly is shown with the expanded capacity in dotted lines in FIG. 4. The added weight and extra compression on the lower springs 68 may be compensated by tightening the nuts 51 to equalize the compression on the upper spring 66 to that on the lower spring 68. In this manner, extra dampening capacity is added to compensate for the added weight of the extra copy styluses and respective drive means.

This manner of increasing the capacity of an individual pantograph apparatus is limited only by the size of the frame originally obtained. It is anticipated that only frames having the large capacity of copies possible will be manufactured, thus giving the operator the option of many differently sized cutting assemblies and making possible great efficiencies in the manufacture of the highest cost items, i.e., the frame and support shafts, while retaining the capability of easy expansion when needed.

It is also anticipated that an operator might desire to copy originals having varying widths or diameters. To adjust for these various height differences of work pieces, different relative lengths of upper and lower springs are contemplated. For example, when copying a chair leg which is generally of a small diameter, it is necessary to locate the stylus very close to the center of the work piece. Thus, a smaller lower spring 68 and a larger upper spring 66 would be provided in order to retain the correct compression on each of the respective springs 66 and 68. For a larger piece, such as a rifle stock, having a maximum width much greater than that of a chair leg, it would be desirable to have a larger lower spring 68 and a smaller upper spring 66. Of course, the maximum size original which is reproducible when using the subject invention with a capability of reproducing four copies is one having a cross section equal to one-half the distance between adjacent pins. Should one desire to reproduce masters having larger cross sections, it is necessary that a frame having capacity for reproducing at least six copies be used. One may then reproduce, for example, two copies from an original having a maximum cross section of up to twice the distance between adjacent pins if a six copy apparatus is used, by placing the work pieces in the second and sixth positions. Even larger originals may be reproduced in the same manner if an apparatus with larger capacity is used.

To facilitate the operator in determining which size spring should be used with different sized work pieces, it is contemplated that a series of paired springs would be supplied, the relative lengths of each pair corresponding to the maximum width of the diameter of the work piece desired to be copied, and be so marked by suitable indicia. As already stated, the lengths of each spring in a pair would be complementary, their sum being equal to those of other pairs, even though the relative lengths of each would differ.

In operation, an original is placed and secured between pins 28 and 32. The desired number of work pieces are placed between pins 26 and 30. Should the operator only desire one or two copies from one master, he must position the work piece on pins 26 and 30 under the respective copy styluses, for obvious reasons. Springs 66 and 68 having the proper height are selected and placed on the shaft and tightened to the proper compression. The cutter assembly 14 is pushed to the end opposite the helical gear assembly. The apparatus is turned on, supplying power to the stylus drive means 42, which rotates the copy styluses. The master stylus 44 is allowed to follow the design of the original which the copy stylus then duplicates on the work pieces.

The duplicating may be done in either of two ways: the cutting assembly may be run the length of the work pieces while in one position, and then rotated to again run the length of work pieces. This procedure would be repeated until the entire piece has been rotated thereby copying the entire design of the original or master.

The second method would be to slowly rotate the work pieces while retaining the cutting assembly in one position. Upon one complete rotation, the cutting assembly is linearly moved a slight amount on the guide rods 24, thereby duplicating the next feature on the original work piece. In this manner the cutting assembly is moved by small distances to duplicate the entire design of the original. These procedures would remain the same whether duplicating one, two, or a plurality of work pieces from a single master.

While the invention has been described with reference to a preferred embodiment, it will be understood to those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. A pantograph apparatus for making duplicates from a master comprising a frame having horizontally disposed guide means, a copying means for engraving said duplicates secured by support means for reciprocal linear travel on said guide means, and adapted to engrave at least one duplicate according to an original work, wherein the improvement lies in said copying means being positioned at a desired height by resilient compression means positioned on said support means, said resilient compression means being formed by selected interchangeable and complementary sets of resilient compression members, each set being formed of an upper and lower member, each set positioning said copying means at different selected heights to accommodate original works having cross sections of different sizes, said lower members supporting the copying assembly and said upper members biasing the copying assembly against lower members thereby securing said copying means in a vibration free manner and allowing said copying means to accurately reproduce said master.

2. The pantograph apparatus of claim 1, wherein said copying means comprise selectively interchangeable modules allowing a change from one module means with given capability for engraving a given number of work pieces to a different module means having a capability for engraving a different number of work pieces.

3. The pantograph apparatus of claim 1 wherein said copying means is mounted on said support means, having a master stylus and at least one stylus pivotally mounted on said copying means, said styluses having connecting means for providing cooperating parallel movement independent of said copying means.

4. The pantograph apparatus of claim 3 wherein said styluses are pivotally attached at a point on each stylus spaced from said pivotal mount to a following means to compel said cooperating parallel movement.

5. The pantograph apparatus of claim 1 wherein said resilient compression members comprise helical springs.

6. The pantograph apparatus of claim 5 wherein said support means comprise upstanding spaced support rods, and said helical springs are coiled about said support rods.

* * * * *